United States Patent
Paar et al.

(10) Patent No.: US 8,445,585 B2
(45) Date of Patent: May 21, 2013

(54) AQUEOUS COATING BINDERS FOR CORROSION PROTECTION, WOOD AND CONCRETE

(75) Inventors: Willi Paar, Graz (AT); Roland Feola, Graz (AT); Johann Gmoser, Graz (AT); Rosemaria Grasboeck, Holzhausen (AT)

(73) Assignee: Cytec Surface Specialties Austria GmbH, Werndorf (AT)

( * ) Notice: Subject to any disclaimer, the term of this patent is extended or adjusted under 35 U.S.C. 154(b) by 115 days.

(21) Appl. No.: 12/524,785

(22) PCT Filed: Jan. 8, 2008

(86) PCT No.: PCT/EP2008/000061
§ 371 (c)(1),
(2), (4) Date: Aug. 21, 2009

(87) PCT Pub. No.: WO2008/092544
PCT Pub. Date: Aug. 7, 2008

(65) Prior Publication Data
US 2010/0069563 A1      Mar. 18, 2010

(30) Foreign Application Priority Data
Jan. 29, 2007   (EP) ..................................... 07001858

(51) Int. Cl.
*C08G 69/44*   (2006.01)

(52) U.S. Cl.
USPC ........... 524/602; 524/600; 524/601; 524/845; 525/403; 525/408; 525/437; 525/449

(58) Field of Classification Search
USPC .................. 525/449, 437, 403, 408; 524/600, 524/601, 602, 845
See application file for complete search history.

(56) References Cited

U.S. PATENT DOCUMENTS

| | | | | |
|---|---|---|---|---|
| 3,702,351 A | | 11/1972 | Tesson et al. ................. | 260/835 |
| 4,304,804 A | | 12/1981 | Fitko .............................. | 428/35 |
| 4,401,774 A | * | 8/1983 | Kooymans et al. ........... | 523/402 |
| 4,524,161 A | * | 6/1985 | Feuerhahn .................... | 523/414 |
| 4,659,800 A | | 4/1987 | Daimer et al. ................ | 528/103 |
| 4,837,291 A | | 6/1989 | Paar .............................. | 528/45 |
| 5,074,978 A | * | 12/1991 | Debroy et al. ........... | 106/287.22 |
| 5,439,988 A | * | 8/1995 | Moens et al. ................ | 525/437 |
| 6,653,370 B2 | | 11/2003 | Paar et al. .................... | 523/423 |
| 2002/0091195 A1 | * | 7/2002 | Paar et al. ................. | 525/54.11 |

FOREIGN PATENT DOCUMENTS

| | | |
|---|---|---|
| EP | 0443605 A1 | 8/1991 |
| GB | 2189498 A | 10/1987 |
| JP | 62027470 | 2/1987 |

OTHER PUBLICATIONS

International Search Report—PCT/EP2008/000061.
Written Opinion—PCT/EP2008/000061.
Database WPI Week 198711; Derwent Publications Ltd., London, GB; AN; 1987-075419; XP00247451919.

* cited by examiner

*Primary Examiner* — Robert Jones, Jr.
(74) *Attorney, Agent, or Firm* — Wenderoth, Lind & Ponack, L.L.P.

(57) ABSTRACT

This invention relates to binder mixtures comprising mass fractions of from 70% to 98% of chain-extended epoxy amine adducts A and from 2% to 30% of carboxy functional polyesters B that contain a limited amount of aromatic constituents in mass fractions of up to 15% and have an acid number of from 4 mg/g to 50 mg/g, a method of making these binder mixtures, and a method of use thereof in coatings for metals, wood, cardboard, plaster, and concrete.

9 Claims, No Drawings

AQUEOUS COATING BINDERS FOR CORROSION PROTECTION, WOOD AND CONCRETE

This application is the U.S. National Phase application of International Application No. PCT/EP2008/000061, filed Jan. 8, 2008 and published as WO 2008/092544, which claims benefit of priority from European Patent Application No. 07001858.5, filed Jan. 29, 2007, each of which is incorporated by reference herein in its entirety.

This invention relates to aqueous coating binders for corrosion protection, wood and concrete.

Aqueous binders based on cationically stabilised epoxy amine adducts have been known for application in cathodic electrodeposition coatings, such as described in EP 0 249 850 A1, corresponding to U.S. Pat. No. 4,837,291. These are usually cured by heating their mixtures with capped di- or polyfunctional isocyanates. Epoxy amine adducts that are dispersed in water after neutralisation can be chain-extended with further epoxy resin to yield high molar mass products that do need not an additional curing agent, but form coherent coating films upon drying on substrates such as metal and concrete which exhibit excellent adhesion and impart good corrosion protection. Such systems have been known from EP 1 207 187 B1, corresponding to U.S. Pat. No. 6,653,370 B2.

The corrosion resistance under high temperature and high humidity conditions (temperatures in excess of 30° C., relative humidity in excess of 50%) of such systems still needs to be improved.

It has been found that by admixture of carboxy functional polyesters that contain a limited amount of aromatic constituents in mass fractions of from 0% to 15% and have an acid number of from 4 mg/g to 50 mg/g, the corrosion resistance of systems comprising the said chain-extended epoxy amine adducts can be markedly improved, and surprisingly, such binders may be used to formulate sealers for wood, and it is also possible to coat green concrete using such modified binders.

An object of the invention are therefore binder mixtures comprising mass fractions of from 70% to 98% of chain-extended epoxy amine adducts A and from 2% to 30% of carboxy functional polyesters B that contain a limited amount of aromatic constituents in mass fractions of up to 15% and have an acid number of from 4 mg/g to 50 mg/g.

Another object of the invention is a process for the preparation of binder mixtures comprising mass fractions of from 70% to 98% of chain-extended epoxy amine adducts A and from 2% to 30% of carboxy functional polyesters B that contain a limited amount of aromatic constituents in mass fractions of from 0% to 15% and have an acid number of from 4 mg/g to 50 mg/g, which process encompasses the following steps:

reaction of an epoxy resin A1 having at least one epoxide group per molecule with an aliphatic amine A2 having at least one primary or secondary amino group per molecule to form an epoxy amine adduct A12, neutralising at least partly this epoxy amine adduct A12 by addition of acid, transferring the neutralised epoxy amine adduct A12n into an aqueous phase under stirring, heating the aqueous mixture and adding thereto a further epoxy resin A3 having at least two epoxide groups per molecule, the quantity of A3 being chosen such that the number of reactive hydroxyl and amino groups in A12 is equal to, or greater than, the number of epoxide groups in A3, preparation of a carboxy functional polyester B having an acid number of from 4 mg/g to 50 mg/g by cocondensation of hydroxy functional components B1 selected from the group consisting of linear, branched, and cyclic aliphatic compounds having at least two hydroxyl groups per molecule, and acid functional components B2 having carboxylic acid groups, which comprise at least one aliphatic acid B21 and at least one aromatic acid B22, and wherein the mass fraction of aromatic acids B22 in the sum of the masses of the hydroxy functional components B1 and the acid functional components B2 is up to 15%, admixing the said polyester B to the chain-extended epoxy amine adduct A, and dispersing the said mixture of A and B in water.

A further object of the invention is a method of use of the binder mixtures of chain-extended epoxy amine adducts A and of carboxy functional polyesters B to form coating films on substrates comprising mixing and homogenising the binder mixtures, optionally together with pigments or fillers, to form a coating composition, applying the said coating composition to a substrate, and subjecting the said the coating composition to drying without addition of a curing agent.

The epoxy resins A1 have at least one, preferably two, 1,2-epoxide groups per molecule, and are of aromatic or aliphatic nature. Glycidyl ethers of monohydric aliphatic or mixed aliphatic-aromatic alcohols, or glycidyl esters of aliphatic or aromatic monocarboxylic acids are preferred as monoepoxides. The alcohols are preferably selected from the group consisting of 2-ethyl hexanol, decanol, tridecanol, stearyl alcohol, and benzyl alcohol. The acids are preferably selected from the group consisting of branched aliphatic monocarboxylic acids having from 5 to 11 carbon atoms, particularly, glycidyl neopentanoate, glycidyl 2-ethyl hexanoate, glycidyl neodecanoate, and the mixtures of such acids which are commercially available under the trade names of ®Versatic acids. Mixtures of such ethers and such esters can likewise be used. Other aliphatic epoxides can be formed by epoxidation of olefins or diolefins, such as hexene-1, 1,3-butadiene, 1,5-hexadiene, or by reaction of epichlorohydrin with dihydric alcohols such as 1,4-butane diol, 1,6-hexanediol, or oligomeric ethylene and propylene glycols. Aromatic diepoxides may be formed by reaction of epichlorohydrin with dihydroxyaromatic compounds such as resorcinol, dihydroxy diphenyl, dihydroxydiphenyl sulphone, or dihydroxy benzophenone. Particularly preferred are reaction products of epichlorohydrin with Bisphenol A (2,2-bis-(4-hydroxyphenyl)propane), and Bisphenol F (bis-(4-hydroxyphenyl)methane). In addition to these diepoxides mentioned, glycidyl ethers of tri- or polyhydric alcohols such as trimethylol ethane and propane, ditrimethylol ethane and ditrimethylol propane, pentaerythritol, and dipentaerythritol, as well as ethoxylation or propoxylation products of the said alcohols may also be used, with an average of from two to twenty oxyalkylene groups per one hydroxyl group of the said alcohols are preferred. Glycidyl esters of dibasic or polybasic organic acids can also be used, preference being given to those of succinic acid, adipic acid, phthalic acid, isophthalic acid, terephthalic acid, trimellithic acid, trimesic acid, and benzophenone tetracarboxylic acid. It is preferred to use such epoxy resins A1 having a specific epoxide group content (e=n/m, amount of substance n(EP) of epoxide groups in the resin, divided by the mass m of the resin) of from 0.5 mol/kg to 8 mol/kg, particularly preferred of from 1 mol/kg to 6 mol/kg.

As amines A2, aliphatic linear, branched or cyclic amines having from 2 to 40 carbon atoms are preferred. These amines A2 may be selected from the group consisting of amines A21 having at least one primary amino group and optionally, one or more further non-primary amino groups, and amines A22 having at least one secondary amino group and optionally, one or more hydroxyl groups.

In addition to the at least one primary amino group, the amines A21 may have one or more further amino groups selected from the group consisting of secondary and tertiary amino groups. Particularly preferred are diamines, triamines, and tetramines with two primary amino groups, such as ethylene diamine, 1,2- and 1,3-propylene diamine, 1,4-diaminobutane, 1,6-diaminohexane, diethylene triamine, triethylene tetramine, 1,2-, 1,3-, and 1,4-diaminocyclohexane, isophorone diamine, and 1,3-bisaminomethyl cyclohexane. It is also possible to use oligomeric diamino ethylene imines. Among the primary mono- and diamines having further tertiary amino groups, preference is given to those having at least one primary and at least one tertiary amino groups, and from 4 to 20 carbon atoms, the alkyl residues attached to the tertiary amino group having from 1 to 4 carbon atoms, viz., methyl, ethyl, n-propyl, iso-propyl, n-butyl, sec.-butyl, iso-butyl, and tert.-butyl groups. Such amines are 3-(N,N-dimethylamino)-propylamine, 3-(N,N-diethylamino)-propylamine, N-(2-aminoethyl)-morpholine, N,N∝-bis-(2-aminoethyl)-piperazine. Among the suitable triamines, tris-2-aminoethyl-amine is mentioned. Particularly preferred are ethylene diamine, diethylene triamine, and 1,4-diaminobutane, as well as 3-(N,N-dimethylamino)-propylamine, and 3-(N,N-diethylamino)-propylamine.

The amines A22 have at least one secondary amino group and optionally, one or more hydroxyl groups, examples for these being di-n-butylamine and its isomers, diethanolamine, diisopropanolamine, n-hydroxyethyl piperazine, and 2-methyl-amino ethanol.

If mixtures of A21 and A22 are used, it is preferred to choose the quantities thereof such that the number of aminic hydrogen atoms in A22 is between 50% and 150%, particularly preferred from 75% to 125%, of the number of aminic hydrogen atoms in A21.

It is preferred to use organic monobasic acids to neutralise the adducts A12, such as formic acid, acetic acid, lactic acid, or tartaric acid. Inorganic polybasic acids such as boric acid, phosphoric acid, or their partial esters may also be used.

The epoxy resins A3 have at least two 1,2-epoxide groups, and may be aliphatic or aromatic. Aliphatic diepoxides may be formed by epoxidation of diolefins, such as 1,3-butadiene, 1,5-hexadiene, or by reaction of epichlorohydrin with dihydric alcohols such as 1,4-butane diol, 1,6-hexanediol, or oligomeric ethylene and propylene glycols. Aromatic diepoxides may be formed by reaction of epichlorohydrin with dihydroxyaromatic compounds such as resorcinol, dihydroxy diphenyl, dihydroxydiphenyl sulphone, or dihydroxy benzophenone. Particularly preferred are reaction products of epichlorohydrin with Bisphenol A (2,2-bis-(4-hydroxyphenyl)propane), and Bisphenol F (bis-(4-hydroxyphenyl)methane). In addition to these diepoxides mentioned, glycidyl ethers of tri- or polyhydric alcohols such as trimethylol ethane and propane, ditrimethylol ethane and propane, pentaerythritol, and dipentaerythritol, as well as ethoxylation or propoxylation products of the said alcohols may also be used, with an average of from two to twenty oxyalkylene groups per one hydroxyl group of the said alcohols are preferred. Glycidyl esters of dibasic or polybasic organic acids can also be used, preference being given to those of succinic acid, adipic acid, phthalic acid, isophthalic acid, terephthalic acid, trimellithic acid, trimesic acid, and benzophenone tetra-carboxylic acid. It is preferred to use such epoxy resins A3 having a specific epoxide group content (amount of substance n(EP) of epoxide groups in the resin, divided by the mass m of the resin) of from $e=0.6$ mol/kg to $e=10$ mol/kg, particularly preferred of from $e=1.2$ mol/kg to $e=6$ mol/kg. It is further preferred to choose such epoxy resins A3 with a specific epoxide group content $e(A3)$ which is higher than that of the epoxy resins A1, particularly such that the ratio $e(A3):e(A1)$ is from 1.2 to 5, preferably from 1.5 to 4.

The epoxy amine adducts A have preferably an amine number of from 40 mg/g to 150 mg/g, and hydroxyl numbers of from 30 mg/g to 150 mg/g, in each case in relation to the mass of solid resin. Their Staudinger index is preferably from 30 cm$^3$/g to 100 cm$^3$/g, as measured on solutions in N-methylpyrrolidone at room temperature (23° C.).

The quantity formerly referred to as "limiting viscosity number", called "Staudinger index" $J_g$ in accordance with DIN 1342, part 2.4, is the limiting value of the Staudinger function $J_v$ measured with decreasing concentration and shear stress, wherein $J_v$ is the ratio of the relative change in viscosity $\rho_r-1$, divided by the mass concentration $\beta_B=m_B/V$ of the solute B (mass $m_B$ of the solute in a volume V of the solution), given by $J_v=(\rho_r-1)/\beta_B \cdot \eta_r-1$ stands for the relative change in dynamic viscosity, according to $\eta_r-1=(\eta-\eta_s)/\eta_s$. The relative viscosity $\eta_r$ is the ratio of the dynamic viscosity $\eta$ of the solution under consideration and the dynamic viscosity $\eta_s$ of the pure solvent. The physical significance of the Staudinger index is that of a specific hydrodynamic volume of the solvated polymer coil at infinite dilution and at rest. The unit conventionally used for J is "cm$^3$/g"; formerly also "dl/g".

The acid number is defined according to DIN EN ISO 3682 as the ratio of the mass $m_{KOH}$ of potassium hydroxide needed to neutralise the sample under consideration, and the mass $m_B$ of that sample (mass of solids in the sample in the case of solutions or dispersions); its conventional unit is "mg/g".

The amine number is defined according to DIN 53 176 as being the ratio of that mass $m_{KOH}$ of potassium hydroxide which consumes the same quantity of acid as the sample under consideration, and the mass $m_B$ of the said sample (mass of solids in the sample in the case of solutions or dispersions); its conventional unit is "mg/g".

The hydroxyl number is defined according to DIN EN ISO 4629 as the ratio of the mass $m_{KOH}$ of potassium hydroxide which has the same number of hydroxyl groups as the sample under consideration, and the mass $m_B$ of that sample (mass of solids in the sample in the case of solutions or dispersions); its conventional unit is "mg/g".

Dispersions of the adducts A in water usually have a mass fraction of solids of from 20% to 60%.

It has been found in the present invention that the corrosion protection performance of coatings prepared from these dispersions alone can still be improved, particularly under what is referred to as "tropical conditions" at temperatures of 30° C. or more, and relative humidity of more than 50%, by adding carboxy functional polyesters B.

The polyesters B are characterised by a limited amount of aromatic constituents, where the mass fraction of aromatic constituents, viz. the ratio of the mass m(B22) of aromatic acids B22, to the sum of the masses of all hydroxy functional and acid functional constituents, m(B1)+m(B2), is up to 15%, preferably from 1% to 12.5%, and in particular, from 2% to 10%.

The polyesters are condensation products of hydroxy functional components B1 and acid functional components B2. It is preferred that at least one of B1 and B2 comprises compounds with a functionality of more than 2, i.e. either a trihydric or polyhydric alcohol, or a tribasic or polybasic acid, or both. In this context, "poly" refers to functionality of 4 or more. Preferably, at least the acid component B2 comprises a compound with a functionality of three or more.

It is also preferred that in the reaction mixture of components B1 and B2, the ratio of the amount of substance of hydroxyl groups to the amount of acid groups is between 0.8 mol/mol and 1.7 mol/mol, particularly preferred, between 0.9 mol/mol and 1.6 mol/mol. The acid number of the polyesters B preferably lies in the range of from 4 mg/g to 50 mg/g, and its hydroxyl number is preferably from 80 mg/g to 280 mg/g, particularly preferable from 100 mg/g to 270 mg/g. The Staudinger index of the polyesters, measured in a solution in dimethyl formamide at 23° C., is preferably from 10 cm$^3$/g to 25 cm$^3$/g, particularly preferred from 12 cm$^3$/g to 20 cm$^3$/g, and especially preferred, from 15 cm$^3$/g to 18 cm$^3$/g.

The hydroxy functional components B1 are aliphatic linear, branched or cyclic compounds having at least two primary hydroxyl groups. It is preferred to have at least one linear difunctional hydroxy compound B11 and at least one further hydroxy compound B12 in the hydroxy functional components B1 used for the synthesis of the polyester B, where the compounds B12 comprise at least one trifunctional or polyfunctional hydroxy compound B121 or at least one branched difunctional hydroxy compound B122.

In another preferred embodiment, it is possible to add hydroxy functional poly-lactones such as polycaprolactone diols or triols, which can lower the glass temperature of the resulting polyester and thus modify the adhesion to the substrate.

Compounds B11 are difunctional linear aliphatic alcohols having preferably from 2 to 40 carbon atoms, particularly preferably from 4 to 12 carbon atoms. Suitable compounds are ethylene glycol, 1,3-propylene glycol, 1,4-butane diol, 1,6-hexane diol, and 1,12-dodecane diol, and ether diols such as diethylene glycol or triethylene glycol.

Trifunctional alcohols B121 have at least two primary hydroxyl groups, and at least one more hydroxyl group which can be primary or secondary. They preferably have from 3 to 12 carbon atoms. Suitable compounds include glycerol, diglycerol, trimethylol ethane, trimethylol propane, ditrimethylol ethane, ditrimethylol propane, pentaerythritol, dipentaerythritol, mannitol, and sorbitol.

Branched difunctional alcohols B122 are have at least one tertiary or at least one quaternary carbon atom and from 3 to 10 carbon atoms. Suitable compounds are 1,2-propane diol, 2-methyl-1,3-propane diol, neopentyl glycol, 2,2,4-trimethyl-1,6-hexane diol and 2,4,4-trimethyl-1,6-hexane diol.

It is preferred to have a ratio of the amount of substance of compounds B12 to the amount of substance of compounds B11 of from 3% to 25%, particularly preferred from 5% to 20%.

The acids B2 comprise at least one aliphatic acid B21 and at least one aromatic acid B22. Preferably, at least 80% of the mass of the aromatic acid B22 is constituted by a tri- or polyfunctional acid, polyfunctional again referring to acids with a functionality of four or more. Suitable acids B22 comprise di-, tri- and polyfunctional aromatic acids such as the isomeric phthalic acids, sulphoisophthalic acid, trimellithic acid, trimesic acid, hemimellithic acid, pyromellithic acid, and benzophenone tetra-carboxylic acid, as well as anhydrides thereof. The aliphatic acids B21 are preferably linear and have from 4 to 40 carbon atoms. Suitable compounds are succinic acid, sulfosuccinic acid, glutaric acid, adipic acid, dodecanedioic acid, and dimeric fatty acids which are preferably linear.

The binder mixtures of the invention provide exceptionally good corrosion protection for metals, without the use of additional crosslinkers. Metal coating compositions are usually formulated with defoamers, thixotropy agents, thickeners and also dispersing agents for the pigments and fillers used, which are usually iron oxide pigments, zinc phosphate pigments, and optionally fillers such as those based on kaolin or talc, or mixtures thereof. It has also been found that the binder mixtures of the present invention are particularly useful as sealers for wood. Such coating compositions may be formulated without fillers (as a clear coat), or with fillers such as kaolin or talc, and provide a surprisingly pronounced sealing effect. Coating compositions based on these binder mixtures may also be used with good results in coating paper, cardboard, plaster, and concrete.

It is also possible to modify the epoxy amine adducts A further by including in the reaction leading to these epoxy amine adducts A to the said educts, or starting components, viz. the epoxy resins A1, the aliphatic amines A2, and the further epoxy resins A3, at least one fatty acid A4 as a further component. This fatty acid A4 is preferably unsaturated, having at least one olefinic unsaturation, and has from 6 to 30, preferably from 8 to 26, and particularly preferred, from 16 to 22, carbon atoms. Preferred fatty acids A4 are palmoleic acid, oleic acid, and erucic acid, linolic acid, linoleic acid, elaostearic acid, arachidonic acid and clupanodonic acid as well as the fatty acids obtained from natural oils such as linseed fatty acid, soy bean oil fatty acid, tall oil fatty acid, cotton seed oil fatty acid, isomerised sunflower fatty acid, rape seed oil fatty acid, and fatty acid mixtures derived from dehydrated castor oil. The fatty acid A4 may be reacted in any sequence with the epoxy resins A1 and the amines A2, before further reaction with the epoxy resin A3, such as first reacting A1 and A2, and then reacting the product from this reaction with A4, or first reacting A1 and A4, and then reacting the product from this reaction with A2, or reacting A1 concurrently with A4 and A2.

The invention is further illustrated by the following examples. In these examples as well as in the whole specification, all quantities measured in "%" relate to mass fractions or mass ratios, as measured in cg/g or g/hg, except where specifically denoted otherwise.

EXAMPLES

Example 1

Synthesis of an Epoxy Amine Adduct 1900 g of an epoxy resin based on bisphenol A having a specific content of epoxide groups of 2.1 mol/kg ("epoxy equivalent weight" of 475 g/mol) were dissolved in methoxypropanol together with 129 g of dimethylamino propanolamine, and 208 g of diethanolamine to form a 70% strength solution. The mixture was heated to 110° C. and reacted under stirring until the epoxy groups were completely consumed.

Example 2

Preparation of a Polyester

Into a three neck vessel equipped with a stirrer and a reflux condenser, 531 g (4.5 mol) of hexane diol-1,6, 67 g (0.5 mol)

of trimethylol propane, 438 g (3.0 mol) of adipic acid, and 58 g (0.3 mol) of trimellithic anhydride were charged. The charge was heated to 200° C. by 10 K/h, under stirring and a nitrogen blanket. Water formed in the condensation reaction was separated, and reaction was continued until the acid number had decreased below 25 mg/g. The Staudinger index of the polyester (A1) as measured in a dimethyl formamide solution at 23° C. was 16.5 cm$^3$/g. A hydroxyl number of 209 mg/g was determined on a sample. Finally, the polyester A1 was diluted to a mass fraction of solids of 80% by adding further methoxypropanol.

Further polyesters A2 to A7 were made according to the procedure described supra, using other constituents:

TABLE 1

Compositions of Polyesters

| Polyester Constituents | mass in g | amount of substance in mol | Resin Yield in g | Staudinger Index in cm$^3$/g | Hydroxyl Number in mg/g | Acid Number in mg/g |
|---|---|---|---|---|---|---|
| A1 | | | 984 | 16.5 | 209 | 25 |
| Hexanediol-1,6 | 531 | 4.5 | | | | |
| Trimethylol Propane | 67 | 0.5 | | | | |
| Adipic Acid | 438 | 3.0 | | | | |
| Trimellithic Anhydride | 58 | 0.3 | | | | |
| A2 | | | 1004 | 18.3 | 252 | 18 |
| Hexanediol-1,6 | 531 | 4.5 | | | | |
| Neopentyl Glycol | 83 | 0.8 | | | | |
| Adipic Acid | 467 | 3.2 | | | | |
| Trimellithic Anhydride | 38 | 0.2 | | | | |
| A3 | | | 998 | 28.8 | 238 | 4 |
| Hexanediol-1,6 | 531 | 4.5 | | | | |
| Neopentyl Glycol | 83 | 0.8 | | | | |
| Adipic Acid | 467 | 3.2 | | | | |
| Trimellithic Anhydride | 38 | 0.2 | | | | |
| A4 | | | 1079 | 20.0 | 210 | 19 |
| Butanediol-1,4 | 450 | 5.0 | | | | |
| Trimethylol Propane | 54 | 0.4 | | | | |
| Sulfosuccinic Acid | 505 | 2.5 | | | | |
| Succinic Acid | 142 | 1.2 | | | | |
| Trimellithic Anhydride | 67 | 0.35 | | | | |
| A5 | | | 842 | 26.1 | 215 | 23 |
| Butanediol-1,4 | 360 | 4.0 | | | | |
| Trimethylol Propane | 67 | 0.5 | | | | |
| Adipic Acid | 438 | 3.0 | | | | |
| Trimellithic Anhydride | 96 | 0.5 | | | | |
| A6 | | | 1101 | 17.4 | 156 | 5 |
| Hexanediol-1,6 | 472 | 4.0 | | | | |
| Trimethylol Propane | 67 | 0.5 | | | | |
| Sulfosuccinic Acid | 606 | 3.0 | | | | |
| Trimellithic Anhydride | 77 | 0.4 | | | | |
| A7 | | | 1012 | 15.5 | 107 | 4 |
| Butanediol-1,4 | 315 | 3.5 | | | | |
| Polycaprolactone Diol | 275 | 0.5 | | | | |
| Neopentyl Glycol | 21 | 0.2 | | | | |
| Adipic Acid | 467 | 3.2 | | | | |
| Trimellithic Anhydride | 58 | 0.3 | | | | |
| Comparison | | | 748 | 10.4 | 209 | 3 |
| Neopentyl Glycol | 416 | 4.0 | | | | |
| Adipic Acid | 438 | 3.0 | | | | |

Example 3

Preparation of a Mixture of Epoxy Amine Adduct and a Polyester

The epoxy amine adduct solution of Example 1 was heated to 150° C., and the solvent was removed by distillation under reduced pressure. 147 g of the polyester solution of Example 2 were added, the mixture was stirred for one further hour at 150° C. whereafter the mixture was allowed to cool to 110° C. 60 mmol of glacial acetic acid per 100 g of solid resins were added, and the neutralised resin mixture was diluted to a mass fraction of solids (=non-volatiles) of 40% by addition of fully desalinated water. Within one further hour, 130 g of bisphenol A diglycidylether were added to this aqueous solution at 90° C., and the resulting mixture was kept at this temperature under stirring until the epoxide groups were completely consumed. Further water was added to adjust the solution to a mass fraction of solids of 38%.

Example 4

Primer

The solution of Example 3 was used to formulate a cationic primer. In a mixture of 88 g of fully desalinated water and 22 g of a commercial dispersing agent (®Additol VXW 6208, Cytec Surface Specialties Austria GmbH), 3 g of a commercial defoamer (®Surfynol SE-F, E. I. DuPont de Nemours Company), 6 g of a thixotropy agent (®Luwothix HT, Lehmann & Voss), and 3 g of an acrylate thickener (®Acrysol RM 8/12, Rohm & Haas Company), 62 g of an iron oxide pigment (®Bayferrox, Lanxess AG), 106 g of a modified zinc phosphate pigment (Heucophos ZPO, Heubach GmbH), 55 g of a kaolin filler (®ASP 600, Engelhardt GmbH), and 55 g of a talc filler (®Talkum AT1, Norwegian Talc AS) were dispersed. 480 g of the binder solution of Example 3, together with 3 g of a cobalt siccative as a 3% strength aqueous solution and further 117 g of desalinated water were added thereto. The primer composition thus obtained had an efflux time of approximately thirty seconds, measured in a 4 mm cup according to DIN EN ISO 2431, or DIN 53 211.

Comparative Examples

Primers 5, 6, and 7

Commercial primers based on an aqueous emulsion of an oxidatively drying epoxy resin ester (Primer 5, ®Duroxyn VEF 4380, Cytec Surface Specialties Austria GmbH) and a conventional solvent-borne primer based on a medium oil, rosin-modified alkyd resin (Primer 6, ®Vialkyd AM 404, Cytec Surface Specialties Austria GmbH) were used for comparison. ®AMP 90 is an amine neutralisation agent (2-amino-2-methyl-1-propanol, The DOW Chemical Company, formerly Angus Chemicals). The formulations are described in table 2. A further binder according to EP 1 207 187 B1, Example 2, was tested as Primer 7.

TABLE 2

Primer Compositions

| Constituent | Example 4 (according to the invention) | Primer 5 (Epoxide Resin Ester) | Primer 6 (Conventional Alkyd Resin Primer) |
|---|---|---|---|
| Binder | taken from Example 3 480 g | ® Duroxyn VEF 4380 583 g | ® Vialkyd AM 404 350 g |
| Water | 88 g | | |
| ® AMP 90 (neutralisation agent) | | 2 g | |
| ® Additol VXW 6208 | 22 g | 6 g | 10 g |
| ® Surfynol SE-F | 3 g | 3 g | |
| ® Bayferrox 140 | 62 g | 88 g | 99 g |
| ® Heucophos ZPO | 106 g | 100 g | 101 g |
| ® ASP 600 | 55 g | 60 g | 60 g |
| ® Talcum AT1 | 55 g | 60 g | 60 g |
| ® Luwothix HT | 6 g | 6 g | 10 g |
| ® Acrysol RM 8/12 WA | 3 g | 10 g | |
| ® Additol XL 280 | | | 19 g |
| Cobalt Octoate 3% Strength Aqueous Solution | 3 g | 6 g | |
| Water | 117 g | 76 g | |
| Xylene | | | 278 g |
| Primer Composition | 1000 g | 1000 g | 1000 g |

Example 8

Corrosion Test Results

The primers of Table 2 and Primer 7 having all an efflux time from a 4 mm cup of about 30 s were applied to untreated steel sheets by spraying in a dry film thickness of approximately 30 μm. After drying for 10 days at room temperature, a corrosion test was conducted in accordance with DIN 50 021. The results obtained are listed in table 3.

TABLE 3

Corrosion Test Results

| Exposure Time | Primer of Ex. 4 | Primer 5 | Primer 6 | Primer 7 |
|---|---|---|---|---|
| 72 h | + | + | + | + |
| 144 h | + | 0 | + | + |
| 240 h | + | − | + | + |
| 400 h | + | − | − | 0 |
| 720 h | + | − | − | − |

As can be seen, the corrosion protection of the inventive primer composition is better than that achieved with primers of the state of the art.

Example 9

Influence of the Polyester

Example 3 was repeated, wherein the influence of the kind and quantity of polyester admixed to the epoxy amine adduct is shown in the following table 4:

TABLE 4

Influence of Polyester Addition

| Example | Mass Fraction of Epoxy Amine Adduct of Example 1 | Polyester according to Example 2 Kind | Polyester according to Example 2 Mass Fraction | Characteristic Temperatures of the Mixture $T_G$ | Characteristic Temperatures of the Mixture $T_{MFF}$ | Corrosion Resistance After 240 h | Corrosion Resistance After 400 h | Corrosion Resistance After 720 h |
|---|---|---|---|---|---|---|---|---|
| 9.1 | 95% | A1 | 5% | 38° C. | 14° C. | + | + | − |
| 9.2 | 90% | A1 | 10% | 33° C. | 8° C. | + | + | + |
| 9.3 | 85% | A1 | 15% | 26° C. | 4° C. | + | + | + |
| 9.4 | 90% | A4 | 10% | 32° C. | 6° C. | + | + | + |
| 9.5 | 85% | A4 | 15% | 24° C. | 3° C. | + | + | + |
| 9.6 | 80% | A4 | 20% | 16° C. | 0° C. | + | + | 0 |
| 9.7 | 100% | none | 0% | 42° C. | 22° C. | + | 0 | − |

As can be seen, the optimum range for the mass fraction of the polyester in the binder mixture is from 5% to 15%. There appears to be no direct correlation to any of the characteristic temperatures of the binder mixture, neither the glass transition temperature $T_G$ nor the minimum film forming temperature $T_{MFF}$. Example 9.7 corresponds to the primer 2 of EP 1 233 034 B1. A similar effect was found for the efficiency as sealer in wood coating, where the optimum range of added polyester was from 3% to 25%.

The invention claimed is:

1. Aqueous coating binder mixtures comprising mass fractions of from 70% to 98% of chain-extended epoxy amine adducts A having an amine number of from 40 mg/g to 150 mg/g, and a hydroxyl number of from 30 mg/g to 150 mg/g, and from 2% to 30% of carboxy functional polyesters B, which carboxy functional polyesters B are condensation products of hydroxy functional components B1 and acid functional components B2 which acid functional components B2 comprise at least one aliphatic acid B21 and at least one aromatic acid B22, at least 80% of the mass of which is constituted by a trifunctional or polyfunctional acid, and which carboxy functional polyesters B contain a limited amount of aromatic constituents in mass fractions of from 1% up to 12.5% and have an acid number of from 4 mg/g to 50 mg/g, the aqueous coating binder mixtures being obtained by admixing the polyester B to the chain-extended epoxy-amine adduct A, and dispersing the mixture of A and B in water.

2. The aqueous coating binder mixtures of claim 1 wherein the epoxy amine adducts A are obtained by reacting an epoxy resin A1 having at least one epoxide group per molecule with an aliphatic amine A2 having at least one primary or secondary amino group per molecule to form an epoxy amine adduct A12, neutralising at least partly this epoxy amine adduct A12 by addition of acid, transferring the neutralised epoxy amine adduct A12n into an aqueous phase under stifling, heating the aqueous mixture and adding thereto a further epoxy resin A3 having at least two epoxide groups per molecule, the quantity of A3 being chosen such that the number of reactive hydroxyl and amino groups in A12 is equal to, or greater than, the number of epoxide groups in A3.

3. The aqueous coating binder mixtures of claim 2 wherein a fatty acid A4 is reacted with the epoxy resins A1 and the amines A2, before further reaction with the epoxy resin A3.

4. The aqueous coating binder mixtures of claim 1 wherein the carboxy functional polyester B having an acid number of from 4 mg/g to 50 mg/g is obtained by cocondensation of hydroxy functional components B1 selected from the group consisting of linear, branched, and cyclic aliphatic compounds having at least two hydroxyl groups per molecule, and acid functional components B2 having carboxylic acid groups, which comprise at least one aliphatic acid B21 and at least one aromatic acid B22, and wherein the mass fraction of aromatic acids B22 in the sum of the masses of the hydroxy functional components B1 and the acid functional components B2 is from 2% up to 10%.

5. A process to make the aqueous coating binder mixtures of claim 1, which process comprises:

reacting an epoxy resin A1 having at least one epoxide group per molecule with an aliphatic amine A2 having at least one primary or secondary amino group per molecule to form an epoxy amine adduct A12, neutralising at least partly this epoxy amine adduct A12 by addition of acid, transferring the neutralised epoxy amine adduct A12n into an aqueous phase under stirring, heating the aqueous mixture and adding thereto a further epoxy resin A3 having at least two epoxide groups per molecule, the quantity of A3 being chosen such that the number of reactive hydroxyl and amino groups in A12 is equal to, or greater than, the number of epoxide groups in A3, preparing a carboxy functional polyester B having an acid number of from 4 mg/g to 50 mg/g by cocondensation of hydroxy functional components B1 selected from the group consisting of linear, branched, and cyclic aliphatic compounds having at least two hydroxyl groups per molecule, and acid functional components B2 having carboxylic acid groups, which comprise at least one aliphatic acid B21 and at least one aromatic acid B22, at least 80% of the mass of which is constituted by a trifunctional or polyfunctional acid, and wherein the mass fraction of aromatic acids B22 in the sum of the masses of the hydroxy functional components B1 and the acid functional components B2 is from 1% up to 12.5%, admixing the carboxy functional polyester B to the chain-extended epoxy amine adduct A, and dispersing said mixture of A and B in water.

6. The process of claim 5 wherein a fatty acid A4 is reacted with the epoxy resins A1 and the amines A2, before further reaction with the epoxy resin A3.

7. The process of claim 6 wherein in a first step, a fatty acid A4 is reacted with the epoxy resins A1, before further reaction with the amines A2 and the epoxy resin A3.

8. The process of claim 6 wherein a fatty acid A4 is reacted with the epoxy resins A1 and the amines A2 in a concurrent reaction.

9. A method of use of the aqueous coating binder mixtures of claim 1, comprising admixing to the binder mixture at least one of a defoamer, a thickener, a dispersing agent, a filler, and a pigment, to form a coating composition, and applying the coating composition to a substrate selected from the group consisting of a base metal, wood, cardboard, plaster, and concrete.

* * * * *

UNITED STATES PATENT AND TRADEMARK OFFICE
CERTIFICATE OF CORRECTION

PATENT NO. : 8,445,585 B2
APPLICATION NO. : 12/524785
DATED : May 21, 2013
INVENTOR(S) : Paar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 137 days.

Signed and Sealed this
Eighth Day of September, 2015

Michelle K. Lee
*Director of the United States Patent and Trademark Office*